Aug. 31, 1926.
J. N. VASQUEZ
1,597,845
CRUSHED ICE CONTAINER
Filed Sept. 15, 1924    2 Sheets-Sheet 1
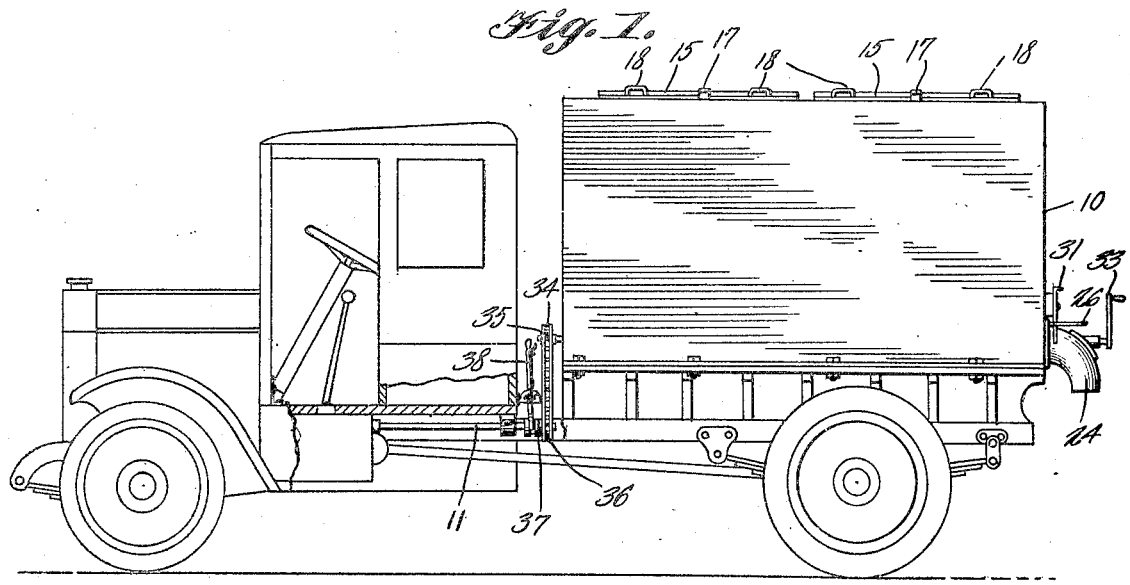
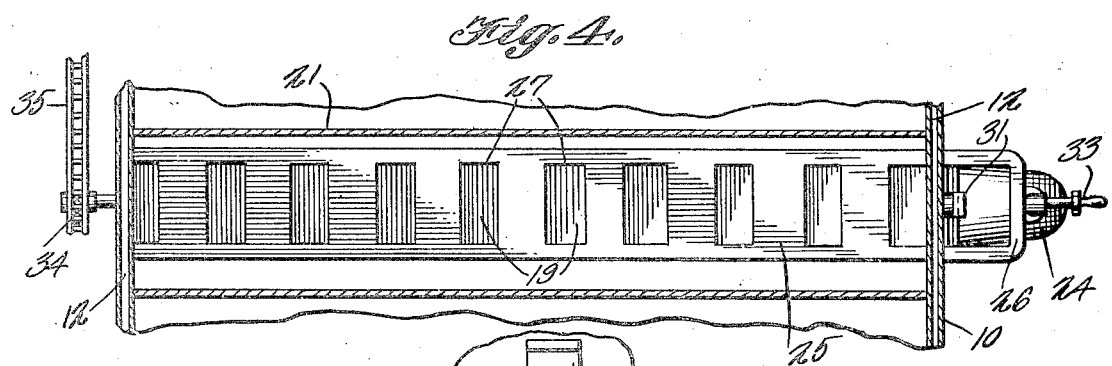
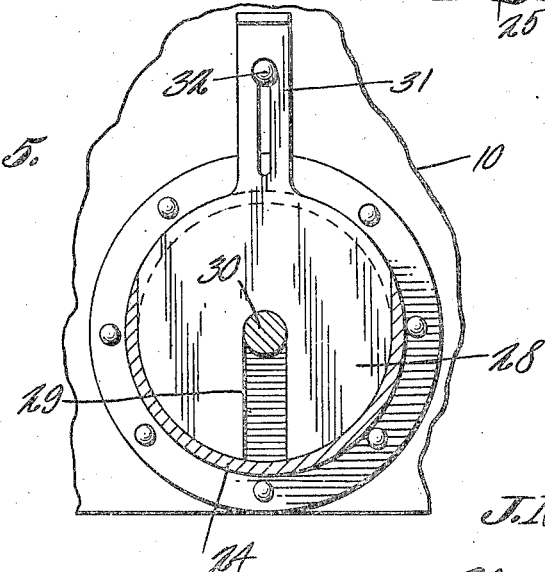
J. N. Vasquez,
INVENTOR
BY Victor J. Evans
ATTORNEY
WITNESS:

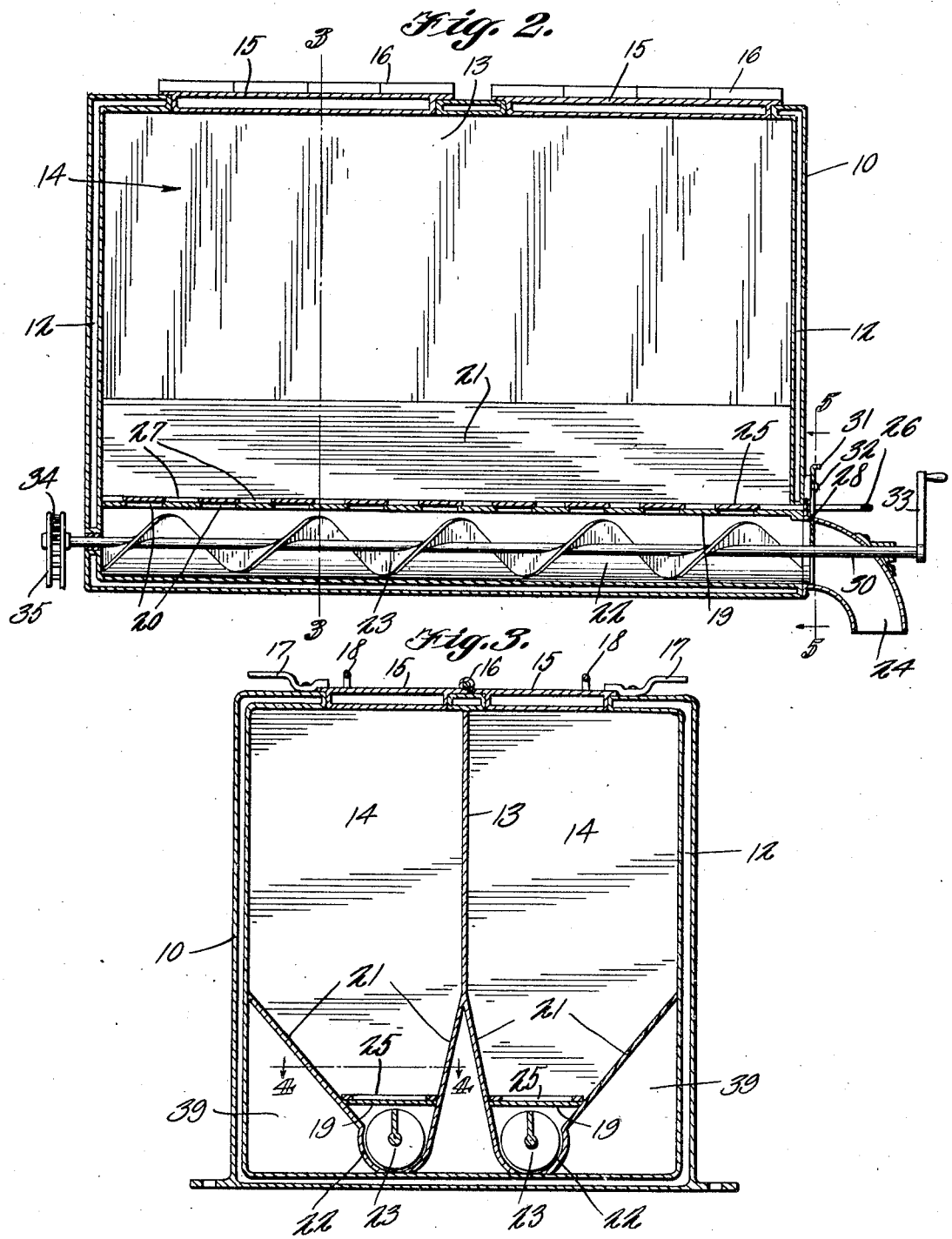

Patented Aug. 31, 1926.

1,597,845

UNITED STATES PATENT OFFICE.

JOSEPH N. VASQUEZ, OF SAN ANTONIO, TEXAS.

CRUSHED-ICE CONTAINER.

Application filed September 15, 1924. Serial No. 737,953.

This invention relates to improvements in vehicles and has for an object the provision of a vehicle which includes a body or container adapted for transporting and dispensing crushed ice or other commodities or materials.

Another object of the invention is the provision of a container having novel means for controlling the discharge of and dispensing its contents, together with means whereby the dispensing means may be operated either mechanically or manually.

Another object is the provision of a container which includes a plurality of separate compartments each of which is provided with individual discharging and dispensing means.

With the above and other objects in view, the invention further includes the following novel features and details of construction, to be hereinafter more fully described, illustrated in the accompanying drawings and pointed out in the appended claims.

In the drawings:—

Figure 1 is a side elevation partly in section showing a motor operated vehicle with the container mounted thereon.

Figure 2 is a longitudinal sectional view of an enlarged scale showing the container removed from the vehicle.

Figure 3 is a section on the line 3—3 of Figure 3.

Figure 4 is a fragmentary section on the line 4—4 of Figure 3.

Figure 5 is an enlarged fragmentary section taken substantially on the line 5—5 of Figure 2.

Referring to the drawings in detail wherein like characters of reference denote corresponding parts, the container which is indicated generally at 10 is shown as mounted upon a motor driven truck, the drive shaft of which is indicated at 11.

The container may be suitably attached to the truck and is formed of inner and outer spaced walls so as to provide an air chamber 12. The walls may be formed of any suitable material, the inner wall being preferably formed of some heat resisting material.

The container is divided by means of a partition 13 into separate compartments 14 and the top of each compartment is provided with an opening which is normally closed by a door 15. These doors are hingedly mounted as shown at 16 and are provided with locking devices 17 and handles 18.

Each of the compartments 14 is provided with a relatively narrow bottom 19 and these bottoms are provided with openings 20, while inclined walls 21 extend upwardly from the opposite side edges of the bottoms 19. The walls 21 extend below the bottoms and are connected so as to provide a trough 22 and mounted for rotation within the trough below each compartment is a spiral conveyor 23 which is adapted to be operated to convey material from the compartments 14 along the troughs 22, the outer ends of which are provided with discharge spouts 24.

In order to control the transfer of the contents of the compartments 14 to the conveyors 23 there is slidingly mounted upon the top of each of the bottoms 19 a slide or valve 25, the outer end of which is formed to provide a handle 26 which extends beyond the container. The slide 25 is provided with spaced openings 27 which are adapted to be moved into and out of register with the openings 20 so that the contents of the compartments 14 may pass into the troughs 22.

If desired, the outer end of the trough 22 at its point of connection with the spout 24 may be provided with a gate valve 28 which is slotted as shown at 29 so as to straddle the shaft 30 of the conveyor 23, the said gate valve operating through a slot provided in the top of the discharge spout 24. Extending upwardly from the gate valve 28 is a slotted handle 31 which receives a headed stud 32 extending from the container 10 and acts to guide the valve and limit its outward movement.

One end of the shaft 30 is provided with a crank arm 33 by means of which the conveyor may be manually operated. The opposite end of the shaft is operatively connected to the shaft 11 of the truck so that the conveyor may be driven by the truck motor. For this purpose the shafts 30 have mounted thereon sprockets 34 over which passes a chain 35, the said chain passing around a sprocket 36 which is freely rotatable upon the shaft 11. The sprocket 36 is adapted to be locked to the shaft by means of a clutch 37 which is controlled by a hand lever 38.

The invention is especially adapted for transporting and dispensing crushed ice, although it is adapted for use with other articles or commodities. If desired, compartments 39 which are provided along opposite side edges of the container 10 may be used for carrying salt such as is commonly used for ice cream and these compartments 39 may if desired be provided with dispensing conveyors of a character similar to the conveyors 23.

The invention is suceptible of various changes in its form, proportions and minor details of construction and the right is herein reserved to make such changes as properly fall within the scope of the appended claims.

Having described the invention what is claimed is:—

1. In a vehicle body, a container having a vertically disposed central partition therein dividing the container into separate compartments, relatively narrow bottoms for the compartments, said bottoms having openings therein, inclined walls extending from the opposite edges of the compartments, a conveyor extending longitudinally beneath each compartment, means whereby the conveyors may be operated and a slide having openings therein and movable upon the bottoms of the compartments for controlling the discharge of the contents of the latter.

2. In a vehicle body, a container having a vertically disposed central partition therein dividing said container into separate compartments, relatively narrow bottoms for the compartments, said bottoms having openings therein, inclined walls extending from the opposite edges of the compartments, a conveyor extending longitudinally beneath each compartment, a discharge chute at the outer end of each compartment, means at the outer end of each compartment to operate the conveyors and means also at the outer end of each compartment to control the discharge of the contents of the compartment into the conveyor.

In testimony whereof I affix my signature.

JOSEPH N. VASQUEZ.